(12) United States Patent
Nowara

(10) Patent No.: US 6,445,713 B1
(45) Date of Patent: Sep. 3, 2002

(54) METHOD FOR MEASURING CDMA SIGNAL

(75) Inventor: Kenji Nowara, Tokyo (JP)

(73) Assignee: Advantest Corporation, Tokyo (JP)

(*) Notice: Subject to any disclaimer, the term of this patent is extended or adjusted under 35 U.S.C. 154(b) by 0 days.

(21) Appl. No.: 09/157,889

(22) Filed: Sep. 21, 1998

(30) Foreign Application Priority Data

Sep. 22, 1997 (JP) .............................................. 9-257123

(51) Int. Cl.$^7$ ........................ H04B 17/00; H04B 7/216; H04J 3/06; H04J 13/00; H04L 27/06
(52) U.S. Cl. ........................................ 370/441; 370/335
(58) Field of Search ................................. 370/350, 335, 370/342, 441, 479, 503, 516, 517, 518, 519, 252; 375/147, 224, 226, 331, 316, 340, 350; 455/226.2, 258

(56) References Cited

U.S. PATENT DOCUMENTS

| | | | | |
|---|---|---|---|---|
| 5,206,886 A | * | 4/1993 | Bingham | 455/258 |
| 5,732,105 A | * | 3/1998 | Andren et al. | 375/226 |
| 5,799,038 A | * | 8/1998 | Nowara et al. | 375/224 |
| 5,946,359 A | * | 8/1999 | Tajiri et al. | 375/331 |
| 6,104,983 A | * | 8/2000 | Nakada | 370/342 |
| 6,157,820 A | * | 12/2000 | Sourour et al. | 455/226.2 |

* cited by examiner

Primary Examiner—Huy D. Vu
Assistant Examiner—Toan Nguyen
(74) Attorney, Agent, or Firm—David N. Lathrop; Gallagher & Lathrop

(57) ABSTRACT

In a measurement of a quality of a CDMA signal diffused by a long code and a short code, the measurement can be performed even if a carrier frequency error is relatively large. A received signal is converted to a complex base band signal s (12) and a symbol point of the signal extracted (33). A frequency error $\Delta f$ is obtained from a phase slippage from the signal point (34). The signal s is corrected by the $\Delta f$ and the corrected signal s' is decoded by a diffusion signal of each channel. Also each power is obtained and each reference signal is created. A delay time $\tau$ is obtained from each reference signal and the signal s' such that a square error $\epsilon$ between them is minimized (37). The signal s' is corrected by the value $\tau$. Regarding the corrected signal s" thereof, a frequency error and an initial phase are obtained such that $\epsilon$ is minimized (38). The signal s" is corrected by those frequency error and initial phase to generate a signal s'''. An amplitude is measured using the signal s''' and the reference signal and further, a measurement item is calculated (22).

9 Claims, 4 Drawing Sheets

METHOD FOR MEASURING CDMA SIGNAL

BACKGROUND OF THE INVENTION

1. Field of the Invention

The present invention relates to a method for measuring the waveform quality of a signal to be transmitted in a CDMA (Code Division Multiple Access) system.

2. Description of the Related Art

A conventional method of this type is described, for example, in a thesis entitled "Overview of Code-Domain Power, Timing, and Phase Measurements", Hewlett-Packard Journal, pp. 73–93, February 1996. In this method, as shown in FIG. 5, a received signal to be measured which has been converted to an intermediate frequency signal is inputted to a base band converting part 12 from an input terminal 11 and is converted to a base band signal. On the other hand, a diffusion code series from an input terminal 13 is inputted to a reference signal creating part 14 and a reference signal is created. Then a time base is extracted by a time base extracting part 15 from the reference signal and the base band signal from the base band converting part 12. The converted base band signal to be measured is corrected by a correcting part 16 based on the extracted time base. Then a frequency error and an initial phase of a carrier wave are estimated by a rough estimating part 17 from the corrected base band signal and the created reference signal. The corrected base band signal from the correcting part 16 is corrected by a correcting part 18 based on the estimated frequency error and the estimated initial phase. A frequency error and an initial phase of the carrier wave are further estimated by a close estimating part 19 based on the corrected base band signal and the diffusion code series from the terminal 13. The base band signal from the correcting part 16 is corrected by a correcting part 21 based on the estimated values of the frequency error and the initial phase of the carrier wave. From the corrected base band signal and the diffusion code series from the terminal 13, a waveform quality including a code domain power coefficient (a power ratio to all signals in each channel) is calculated by a measurement item calculating part 22.

In the conventional method described above, since a time base is directly extracted from a base band signal which is converted from a signal to be measured, there is a danger that the extracted time base is in error when a carrier frequency error is large to some extent. According to the above literature, when a signal length to be used for a time base extraction is 1.25 ms, the allowable frequency error is 400 Hz.

SUMMARY OF THE INVENTION

It is an object of the present invention to provide, even if a carrier frequency error of is equal to or more than 400 Hz, a method which can correctly extract a time base and hence can correctly measure a waveform quality.

In order to accomplish the above object, in an aspect of the present invention, there is provided a method for measuring a CDMA signal comprising: an orthogonal converting step for converting a digital signal to be measured into a first complex base band signal; a time base/frequency error estimating step for estimating a first signal delay value from the first complex base band signal and a diffusion code series and for estimating a first frequency error utilizing the estimated first signal delay value; a frequency error correcting step for correcting the first complex base band signal by the first frequency error and for shifting the first complex base band signal by the first signal delay value to obtain a second complex base band signal; a reference signal creating step for creating a reference signal from the second complex base band signal and a diffusion code series; a parameter estimating/correcting step for estimating and correcting a parameter from the second complex base band signal and the reference signal to obtain a third complex base band signal; and a measurement item calculating step for calculating a measurement item from the third complex base band signal and the reference signal.

In a preferred embodiment, the orthogonal converting step includes a sampling rate converting step for converting a complex base band signal into a sampling frequency having n time frequency (n is an integer number) of its chip rate to obtain the first complex base band signal.

The time base/frequency error estimating step comprises: a symbol point extracting step for detecting a sampling point closest to a symbol point from the first complex base band signal to estimate the first signal delay value; and a synchronizing/frequency error estimating step for detecting, for each of the extracted symbol points, a phase of a diffusion code series from the first complex base band signal and a diffusion code series to estimate the first frequency error from the phase difference.

The synchronizing/frequency error estimating step comprises: a long code mask detecting step for detecting a long code mask portion from the first complex base band signal and a diffusion code series; and an estimating step for detecting a phase of a long code following the long code mask portion from the first complex base band signal and a diffusion code series to estimate the first frequency error from the phase difference.

The reference signal creating step comprises: a demodulating/power estimating step for demodulating each channel from the second complex base band signal and a diffusion code series of each channel and for estimating a first power value of each channel; and a reference signal generating step for creating a reference signal of each channel from the diffusion code series of each channel and the first power value of each channel.

The parameter estimating/correcting step comprises: a second symbol point measuring step for estimating a second signal delay value from the second complex base band signal and the reference signal; a signal delay correcting step for shifting the second complex base band signal by the second signal delay value to obtain the third complex base band signal; a frequency error/initial phase estimating step for estimating a second frequency error and an initial phase of a carrier wave; a frequency error/initial phase correcting step for correcting the third complex base band signal by the second frequency error and the initial phase value to obtain a fourth complex base band signal; and an amplitude estimating step for estimating an amplitude of each channel from the fourth complex base band signal and the reference signal.

The second symbol point measuring step and the signal delay correcting step are used a plurality of times in the parameter estimating/correcting step.

According to the present method, even if an input signal (a digital signal to be measured) should include a somewhat large frequency error, a time base can be extracted and hence a code domain power coefficient and a waveform quality of a signal to be measured having a relatively large frequency error can correctly be measured.

DETAILED DESCRIPTION OF THE PREFERRED EMBODIMENTS

Now, an embodiment of the present invention will be described in detail with reference to FIGS. 1 to 4.

Figure 1:
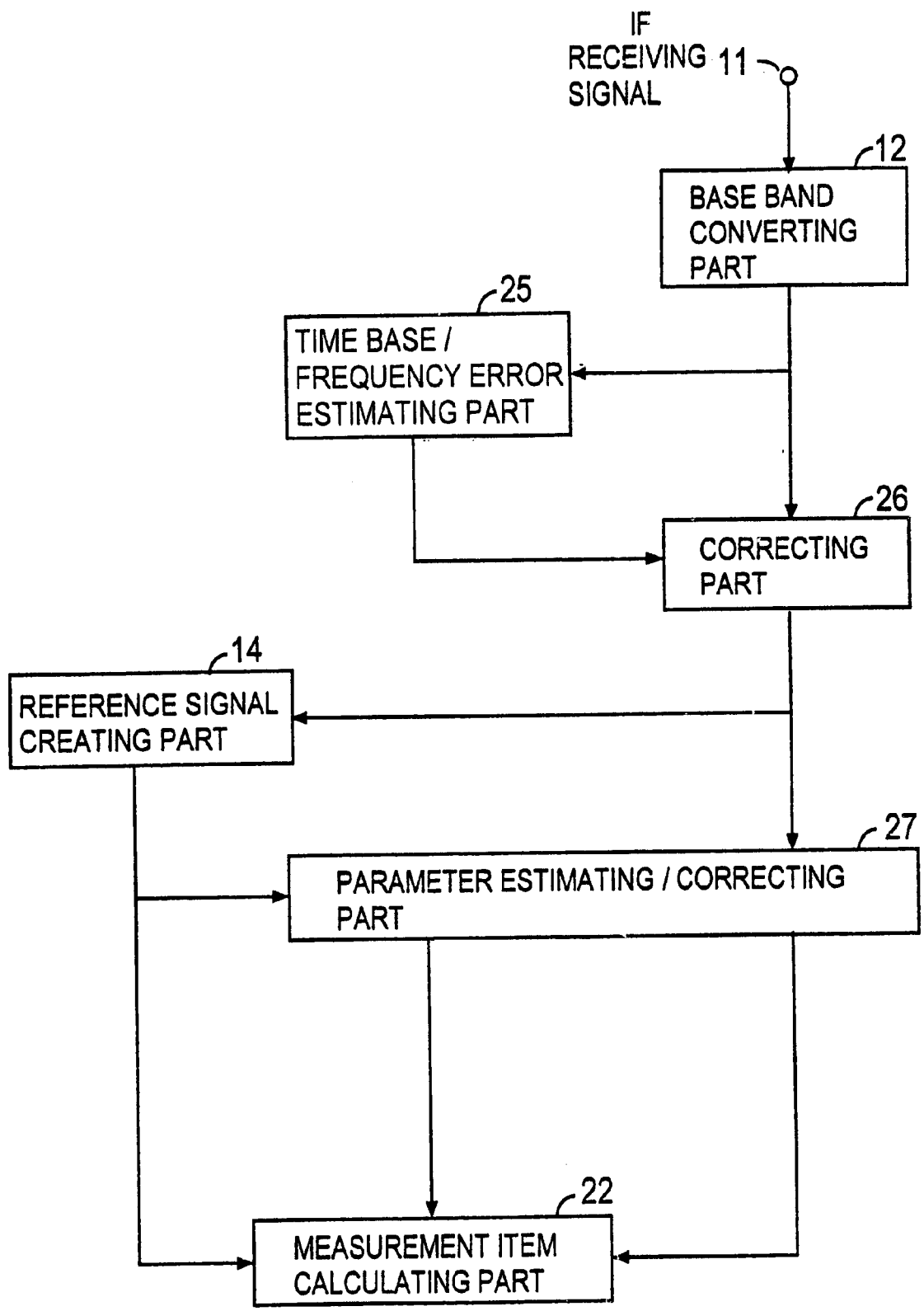
FIG. 1 is a block diagram showing a principle functional construction of the present invention.

FIG. 1 is a block diagram showing the principle construction of a CDMA signal measuring system to which the present invention can be applied. As shown in FIG. 1, a digital signal to be measured which has been converted to an intermediate frequency signal (IF signal) is supplied to an input terminal 11 connected to a base band converter part 12. The digital signal from the input terminal 11 is converted to a complex base band signal in the base band converting part 12. The complex base band signal is supplied to a time base extracting/frequency error estimating part 25 where a time base is extracted from the complex base band signal and at the same time a frequency error is estimated. Based on the extracted time base and the estimated frequency error, the complex base band signal is corrected and supplied to a parameter estimating/correcting part 27 where a time base is also extracted from the corrected complex base band signal. Thus, the time base is extracted from a complex base band signal in two steps, namely, in the time base extracting/frequency error estimating part 25 and the parameter estimating/correcting part 27.

According to the present method, even if an input signal (a digital signal to be measured) should include a somewhat large frequency error, a time base can be extracted and hence a code domain power coefficient and a waveform quality of a signal to be measured having a relatively large frequency error can correctly be measured.

Figure 2:
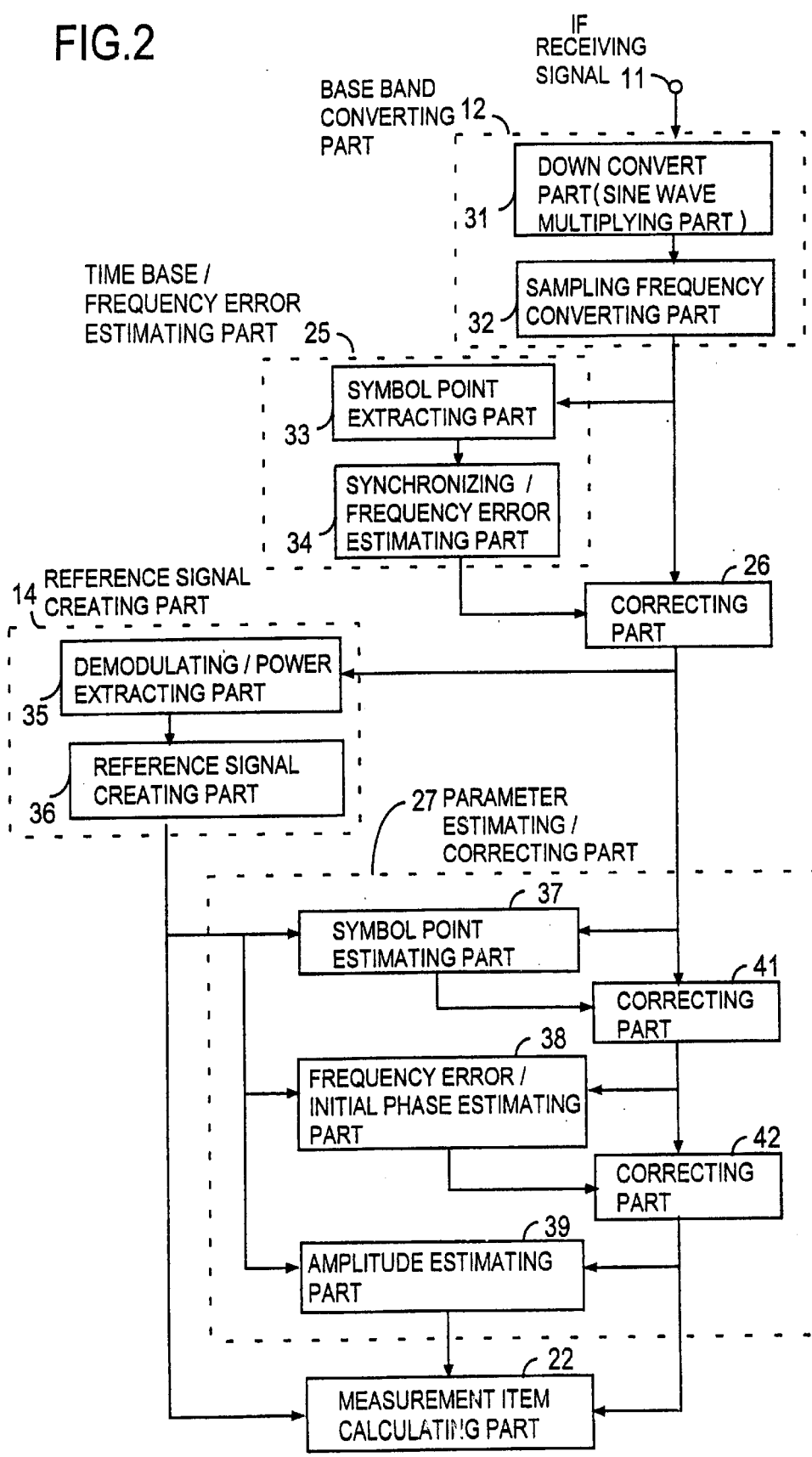
FIG. 2 is a block diagram showing a functional construction of an embodiment of the present invention.

FIG. 2 shows the concrete construction of a CDMA signal measuring system to which the present invention is applied. A signal intended to be measured in this embodiment is a CDMA base station signal which is doubly diffused by a short code series (short code) and a long code series (long code) which is longer enough than the short code, and is multiplexed among a plurality of channels. Therefore, a diffusion code series is a product of a long code and a short code. Here, in each channel, same long codes are used but as the short codes, code series each being orthogonal to one another are used. In addition, the signal to be measured is assumed to be modulated by QPSK as a primary modulation and by BPSK as a secondary modulation (diffusion modulation). In addition, this signal is assumed to have a special channel (here, referred to as a perch channel) which is always available for transmission. Regarding such a signal, a code domain power coefficient (a power ratio to all signals in each channel) can be measured in this embodiment. However, upon the calculation of this code domain power coefficient, each parameter is estimated such that a mean square error between a received signal and a reference signal is minimized.

A signal to be measured (carrier frequency $f_{IF}$) from the input terminal 11, which has been converted to an intermediate frequency signal, is sampled by a sampling frequency $f_S$ and the sampled signal is stored in a memory (not shown). First, a portion having an appropriate length of the IF digital signal is acquired from the memory at an appropriate timing. Then, in order to create a complex base band signal from this acquired signal, the acquired signal is multiplied by a sine wave in a sine wave multiplying part (down converter part) 31. After that, this signal is passed through a low pass filter. In this case, however, when the sampling frequency is not an n time frequency (n is an integer number) of a chip rate of a diffusion code series, an interpolating and/or a thinning out operation is performed in a sampling frequency converting part 32 to make the sampling frequency an n time frequency (n is an integer number) of a chip rate, $f_s'$. The above low pass filter is commonly used as a filter for interpolating and/or thinning out operation. The complex base band signal being sampled by the sampling frequency $f_s'$ is inputted to a symbol point extracting part 33 in a time base/frequency error estimating part 25. In this case, a sampling point closest to a symbol point is extracted out of sampling points. After that, this signal is synchronized with a diffusion code series and at the same time a frequency error of the signal is estimated in a synchronizing/frequency error estimating part 34, and the signal is corrected by the error amount in a complex base band signal correcting part 26.

Next, this corrected complex base band signal is inputted to a demodulating/power estimating part 35 in a reference signal creating part 14. In this case, a demodulation is performed for each channel using a diffusion code series. At the same time, a power for each channel is also estimated. Then, a reference signal of each channel is generated in a reference signal generating part 36. In addition, a reference signal of a multiplexed signal is also generated from the reference signal of each channel and the power estimated in the demodulating/power estimating part 35.

Next, a gap between the symbol point and a sampling point closest to the symbol point is first estimated in a symbol point estimating part 37 from the reference signal of the multiplexed signal and the corrected complex base band signal. Then, the remaining frequency error and initial phase are estimated in a frequency error/initial phase estimating part 38. After that, an amplitude for each channel is re-estimated in an amplitude estimating part 39. Finally, a code domain power coefficient and a waveform quality are calculated in a measurement item calculating part 22 from the complex base band signal whose those parameters are respectively corrected in correcting parts 41 and 42 and the reference signal. Each block will be explained below.

1. Data Acquisition

First, a portion having an appropriate length of an IF digital signal being transmitted stored in a memory is acquired at an appropriate timing. The number of samples to be acquired depends on the number of samples for calculating a code domain power coefficient.

2. Base Band Converting Part 12

In the base band converting part 12, an IF digital signal being transmitted s read out from a memory is converted to a complex base band signal and a sampling frequency is converted to an n time frequency (n is an integer number) of a chip rate of a diffusion code series. This base band converting part 12 comprises two sub-blocks (a sine wave multiplying part 31 and a sampling frequency converting part 32).

2-1. Sine Wave Multiplying Part

In the sine wave multiplying part 31, the IF digital signal being transmitted $Sk=s(kT_s)$ is multiplied by a sine wave $\exp(-j2\pi f_{IF}T_sk)$ ($T_s$ is a sampling interval).

2-2. Sampling Frequency Converting Part

Next, in order to remove harmonic components from the signal multiplied by the sine wave, the signal is passed through a low pass filter. In this case, when the sampling frequency of the IF digital signal being transmitted s read out from the memory is not an n time frequency (n is an integer number) of a chip rate of a diffusion code series for diffusing the signal, an interpolating operation and/or a thinning out operation is performed so that the sampling frequency becomes an n time frequency (n is an integer number) of chip rate. The above low pass filter is used as a filter for the interpolating and/or the thinning out operation. For example, when the sampling frequency of the IF digital signal being transmitted is 40 MHz and the chip rate of the diffusion code series is 4.096 MHz, in order to convert the sampling frequency to an eight time frequency of the chip rate, a Nyquist filter having 48641 taps and a sampling frequency (40×512 MHz) is used to interpolate first the signal being transmitted. After that, by taking out a signal at every 625 samples, the sampling frequency can be converted to an eight time frequency of the chip rate. Hereinafter, the sampling frequency is assumed to be eight times of the chip rate. Further, although a sampling frequency $(1/T_s)$ is usually fixed in each measuring apparatus, a chip rate of a signal being transmitted s to be inputted is not necessarily constant but different depending on a system.

Therefore, a sampling frequency and a chip rate are not necessarily in the relationship of an n time frequency (n is an integer number).

3. Time Base/Frequency Error Estimating Part

Here, a time base is extracted by synchronizing a complex base band signal with a diffusion code series. At the same time, a carrier frequency error is also estimated. This block comprises two sub-blocks (a symbol point extracting part 33 and a synchronizing/frequency error estimating part 34).

3-1. Symbol Point Extracting Part 33

Here, a sampling point closest to a symbol point (center of a chip) is extracted out of consecutive eight samples, i.e., samples corresponding to one chip. In this method, a value i to maximize the following value is obtained and that sampling point is judged to be a sampling point closest to a symbol point.

$$\sum_{k=0}^{N} (x_{i+8k}^2 + y_{i+8k}^2), \quad i = 0, 1, \cdots, 7$$

In this case, x and y respectively represent a real part and a imaginary part of a complex base band signal sampled at an eight time rate of a chip rate. A length value from the leading edge of the complex base band signal to the sampling point closest to the extracted symbol point corresponds to the estimated first signal delay value recited in claim 3.

3-2. Synchronizing/Frequency Error Estimating Part 34

Here, a signal is synchronized with a code series diffusing the signal. At this time, a carrier frequency error is simultaneously estimated. A plurality of channels are multiplexed in a received signal but at this point in time, which channels are multiplexed is not known. However, there exists without fail in this signal a special channel (a perch channel) for always transmitting signals. Therefore, by utilizing diffusion codes used in the perch channel the synchronizing and frequency error estimating operations are performed. In this case, the diffusion code series used in the perch channel is orthogonal to diffusion code series of the other channels in one short code period length. Therefore, if a frequency error is small to some extent, a channel influence from a channel other than the perch channel can be eliminated by multiplying, in the same phase, a base band signal being received by a diffusion code series of the perch channel and by taking a sum (W) throughout the one short code period. Therefore, a search is performed in one period of the diffusion code series of the perch channel to find a position where the following value is maximized. This position can be determined as a synchronization position. The short code length is assumed, in this case and hereinafter, as 64 chips.

$$Z_g = \sum_k |W_{m,k,g}|^2$$

In this case, $$W_{m,k,g} = \sum_{q=0}^{63} (X_{64 \cdot 8 \cdot k + 8q + i + 8m} + jy_{64 \cdot 8 \cdot k + 8q + i + 8m}) \cdot U_{0,q+g}$$

$U_{0,q+g}$: (q+g)th chip of a diffusion code series of the perch channel.

g: 64×L, m=0 to 63.

L: 0 to [(long code length/64)−1].

In addition, $arg(W_{m,k,q})$ represents a sum of kth symbol phase $\Phi_k$, an amount of phase change due to a frequency error and an initial phase. Therefore, in the values m, g providing the synchronization point, if $r_k$ is $r_k = arg(W_{m,k,g}) - \Phi_K$, a frequency error can be estimated by the following equation.

$$\Delta f = (1/2\pi)(1/64M) \sum_{k=0}^{M-1} (\Gamma_{k+1} - \Gamma_k)$$

$$= (1/2\pi)(1/64M)(\Gamma_M - \Gamma_0)$$

Since this is in the case of QPSK,
$\phi_k = Y(arg(W_{m,k,g}) - \Delta\phi_{k-1})$
$\Delta\phi_{k-1} = arg(W_{m,k-1,g}) - \phi_{k-1}$ $$Y(a) = \begin{cases} \pi/4 & \pi/2 > a \geq 0 \\ 3\pi/4 & \pi > a \geq \pi/2 \\ -\pi/4 & 0 > a \geq -\pi/2 \\ -3/4\pi & -\pi/2 > a \geq -\pi \end{cases}$$

Then, the complex base band signal is corrected in the correcting part 26 using the obtained frequency error Δf. In addition, if a chip rate 4.096 MHz and M=640 are assumed, an estimated accuracy of a frequency error Δf and an estimated allowable range are obtained by a workstation as 70 Hz and ±8 kHz, respectively. Here, it is assumed that the complex base band signal has been shifted such that its leading sample becomes a leading chip of a short code. That is, the complex base band signal is shifted by an amount of a second signal delay value which is a length from a sampling point (chip point) closest to a symbol point to a leading edge of a short code in the complex base band signal.

4. Reference Signal Creating Part 14

In the reference signal creating part 14, a reference signal of each channel is created using the received complex base band signal corrected by the frequency error obtained in the synchronizing/frequency error estimating part 25 and a diffusion code series used for each channel. First, a demodulation is performed for each channel and at the same time, a power of each channel is estimated. Then, a reference signal having one time sampling rate of a chip rate is created using a diffusion code series of each channel. In addition, a reference signal of a multiplexed signal is similarly created using the estimated power. This block comprises two sub-blocks (a demodulating/power estimating part 35 and a reference signal generating part 36).

4-1. Demodulating/Power estimating Part 35

Here, a demodulation for each channel is performed and at the same time, a power of each channel is estimated from the corrected complex base band signal ($X''_k+jy'_k$).

First, the demodulation is performed by the following equations when the respective information bits of a real part and an imaginary part are assumed as ak and bk, respectively.

$$a_k = \text{Sign}(A_{i,k,g}(x'))$$

$$b_k = \text{Sign}(A_{i,k,g}(y'))$$

where:

$$A_{i,k,g}(Z) = \Sigma_{q=0}^{63} Z_{64 \cdot 8k+8q} \cdot U_{i,64k+q+g}$$

$U_{i,j}$: jth chip of a diffusion code series in channel i.

In addition, a power of channel i is estimated as follows.

$$P_i = \Sigma_k \{A_{i,k,g}(x')^2 + A_{i,k,g}(y')^2\}$$

4-2. Reference Signal Generating Part 36

Since each symbol (information) length is equal to a period length of a short code, a reference signal of each channel is obtained by the following equation using the obtained demodulation information bits.

$$R_{i,k} = (a_{k/64} + jb_{k/64}) \cdot U_{i,k}$$

where x/y represents a quotient (integer) when x is divided by y.

Similarly, a reference signal of a multiplexed signal is obtained as follows using the obtained power values.

$$R'_k = \Sigma_i \sqrt{R_i R_{i,k}}$$

Hereinafter, parameters are estimated using the reference signal of the multiplexed signal and the complex base band signal corrected in the correcting part 26.

5. Parameter Estimating Part

In the parameter estimating part, a carrier frequency error, an initial phase of a carrier wave, a gap from a symbol point and an amplitude of a signal in each channel are estimated using a reference signal of a multiplexed signal and a complex base band signal corrected in the correcting part 26. In this case, each parameter is estimated such that a square error $\epsilon$ between a reference signal and a received signal is minimized. This block comprises three sub-blocks (a symbol point estimating part 37, a frequency error/initial phase estimating part 38 and an amplitude estimating part 39).

5-1. Symbol Point Estimating Part 37

A frequency error and a power of each channel have been roughly estimated in the synchronizing/frequency error estimating part 34 and the demodulating/power estimating part 35, respectively. Therefore, here, assuming that each estimation error of those estimated values is zero, a gap $\tau$ between a symbol point and a sampling point closest to the symbol point is estimated. As the estimating method, $\tau$ is obtained, from equations $\partial \epsilon/\partial \theta_0 = 0$ and $\partial \epsilon/\partial \tau = 0$, by eliminating $\theta_0$. In this case, the obtained $\tau$ is represented by the following equation.

$$\tau = \frac{AD^2 - A^*B^2}{|B|^2 B + 4A^*BC - BD^2 - 2ADE}$$

where;

$$A = \sum_{k=0}^{L-1} s''_k a^*_k, \quad B = \sum_{k=0}^{L-1} s''_k b^*_k, \quad C = \sum_{k=0}^{L-1} s''_k c^*_k, \quad D = \sum_{k=0}^{L-1} a_k b^*_k,$$

$$E = \sum_{k=0}^{L-1} (|b_k|^2 + a_k c^*_k)$$

$$a_k = \sum_1 \alpha_1 d_{k,1}, \quad b_k = \sum_1 \beta_1 d_{k,1}, \quad c_k = \sum_1 \gamma_1 d_{k,1}$$

$$d_{k,1} = \sum_i \sqrt{P_i} \, e^{j\phi_{i,k+1}}$$

s'': corrected complex base band signal.

$\Phi_{I,k+1}$: (k+1)th symbol phase of channel i.

$\alpha_1, \beta_1, \gamma_1$: coefficients of the respective degrees when a base band filter is approximated by a quadratic equation of a slippage $\tau$ from a symbol point.

$$g(1T_{c+\tau}) = \alpha_1 + \beta_1 \tau + \gamma_1 \tau^2$$

g(t): a base band filter.

In this case, if a chip rate is 4.096 MHz, the number of taps is a number corresponding to 11 chips and L is L=960, the estimation accuracy of $\tau$ is obtained by a workstation to be approximately 3 sec. Then, the complex base band signal is shifted by the amount of $\tau$ in the correcting part 41.

5-2. Frequency Error/initial Phase Estimating Part 38

In this sub-block, the remaining frequency error and initial phase are obtained. As a method for this, the method of least squares is used. Then, the complex base band signal shifted by the amount of $\tau$ is corrected in the correcting part 42 by the amount of value obtained here.

5-3. Amplitude Estimating Part 39

In this sub-block, an amplitude of each channel is estimated. In this case, since a frequency error, a slippage of initial phase and a gap from the symbol point have already been estimated, it is assumed that the respective errors of those estimated values are zero.

A partial differentiation to the square error $\epsilon$ between the reference signal and the received signal is performed with respect to an amplitude of each channel. By making the partial differential value zero, the amplitude of each channel can be obtained as follows.

$$a_i = Re[\Sigma_k s'''_k \exp(j\phi_{i,k})]/N$$

s''': an output signal of the correcting part 42 which is corrected by an output of the frequency error/initial phase estimating part 38.

N: an estimating length

6. Measurement Item Calculating Part 22

In this block, a code domain power coefficient (a power ratio to all signals of each channel) is calculated as follows in accordance with the definition from an output signal of the parameter estimating/correcting part 27 and a reference signal.

$$\rho_i = \frac{\sum_{j=0}^{N-1} \left| \sum_{k=0}^{63} s'''_{64 \times 8j+8k} R^*_{i,64j+k} \right|^2}{\left\{ \sum_{k=0}^{63} |R_{l,k}|^2 \right\} \left\{ \sum_{j=0}^{N-1} \sum_{k=0}^{63} |s'''_{64 \times 8j+8k}|^2 \right\}}$$

$R_i$: an ideal base band signal of channel i,

N: a calculating length of a code domain power coefficient.

In addition, a waveform quality of the multiplexed signal is also calculated as follows in accordance with its definition using an amplitude of each channel re-estimated in the amplitude estimating part 39.

$$\rho = \frac{\left| \sum_{j=0}^{N-1} \sum_{k=0}^{63} s'''_{64 \times 8j+8k} R''^*_{64j+k} \right|^2}{\left\{ \sum_{j=0}^{N-1} \sum_{k=0}^{63} |R''_{64j+k}|^2 \right\} \left\{ \sum_{j=0}^{N-1} \sum_{k=0}^{63} |s'''_{64 \times 8j+8k}|^2 \right\}}$$

R": a reference signal of the multiplexed signal re-created using an amplitude value of each channel estimated in the amplitude estimating part 39.

In the above description, the signal to be measured has been modulated by QPSK as a primary modulation and has been modulated by BPSK as a diffusion modulation, i.e., a secondary modulation. However, if the signal to be measured has been modulated by QPSK as a secondary modulation diffusion modulation), the equations in each block are changed as follows.

Synchronizing/Frequency Error Estimating Part 34:

$W_{k,g} = \Sigma_{q=0}^{63} (X_{64 \cdot 8 \cdot k + 8q + i + 8m} \cdot U_{0,q+g} + jy_{64 \cdot 8 \cdot k + 8q + i + 8m} \cdot V_{0,q+g})$ Demodulating/Power Estimating Part 35:

The equations for deriving information bits:

$a_k = \text{Sign}(A_{i,k,g})$ $b_k = \text{Sign}(B_{i,k,g})$ where;

$A_{i,k,g} = \Sigma_{q=0}^{63} x'_{64 \cdot 8k + 8q} \cdot U_{i,64k+q+g}$ $B_{i,k,g} = \Sigma_{q=0}^{63} y'_{64 \cdot 8k + 8q} \cdot V_{i,64K+q+g}$ $U_{i,j}$: jth diffusion code series of real part side in channel i.

$V_{i,j}$: jth diffusion code series of imaginary part side in channel i.

Power of channel i:

$P_i = \Sigma_k (A_{i,k,g}^2 + B_{i,k,g}^2)$

Figure 3:
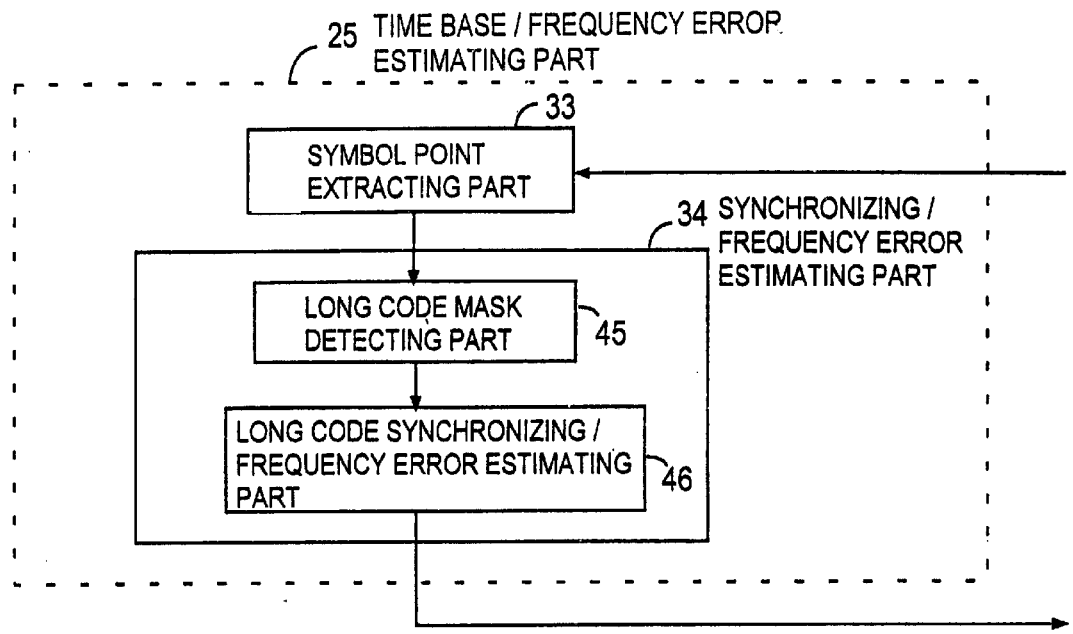
FIG. 3 is a functional construction diagram showing another example of a time base/frequency error estimating part 25 shown in FIG. 2.

In addition, if there is in the signal to be measured a long code mask, i.e., a portion diffused by a short code only inserted at a constant period within the signal doubly diffused by a short code and a long code, a code domain power coefficient can be calculated at high speed by dividing the synchronizing/frequency error estimating part 34 into two sub-blocks 45 and 46 as shown in FIG. 3.

Long Code Mask Detecting Part 45

In this sub-block 45, a short code used in the perch channel is used to detect a long code mask portion. As this method, a correlation between the received complex base band signal and the short code used in the perch channel is calculated, and its peak position is judged to be the long code mask portion. That is, an amount of signal delay (a second delay amount) from the sampling point (chip point) closest to the symbol point extracted in the symbol point extracting part 33 to the end of the long code mask is detected.

Synchronizing/Frequency Error Estimating Part 46

Since the position of the long code mask has been detected by the long code mask detecting part 45, the phase of the succeeding long code can be estimated in a narrow range. That is, an amount of signal delay (a third delay amount) from the phase of the detected long code to the phase of the long code for starting a calculation of a code domain coefficient is measured. Therefore, the diffusion code search range at the time of synchronization can significantly be reduced, and hence a high speed process can be achieved. For example, assuming that the long code length is 40960 chips and long code masks are added at every 2432 chips for a length corresponding to 128 chips, a code domain power coefficient can be calculated at a two time speed.

Figure 4:
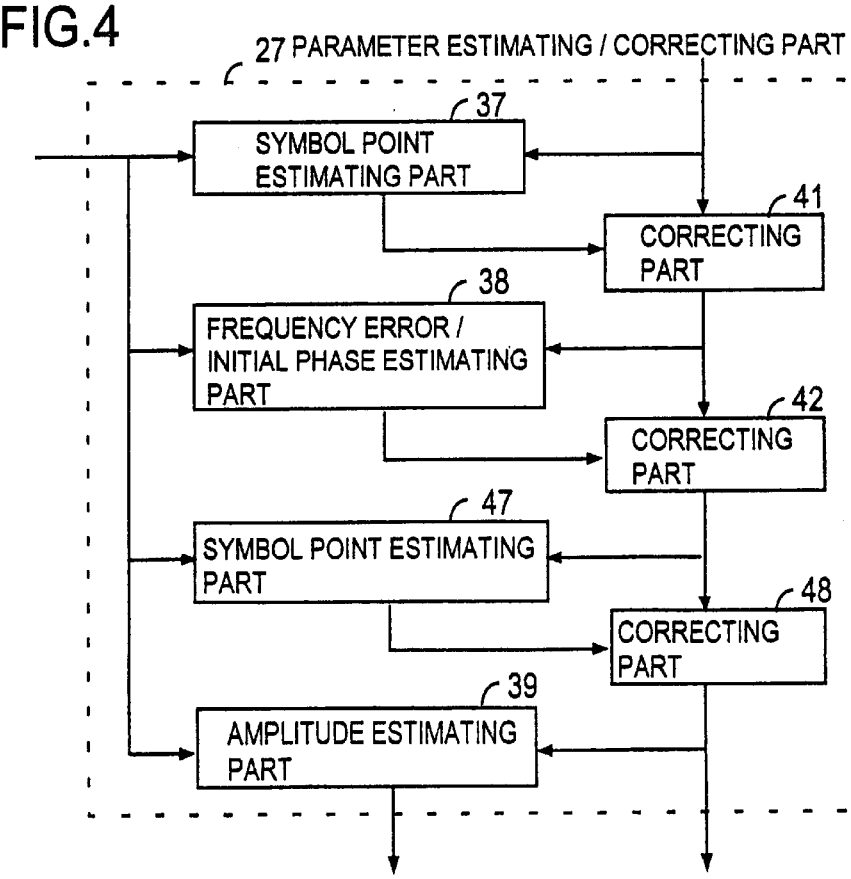
FIG. 4 is a functional construction diagram showing another example of a parameter estimating/correcting part 27 shown in FIG. 2.
Figure 5:
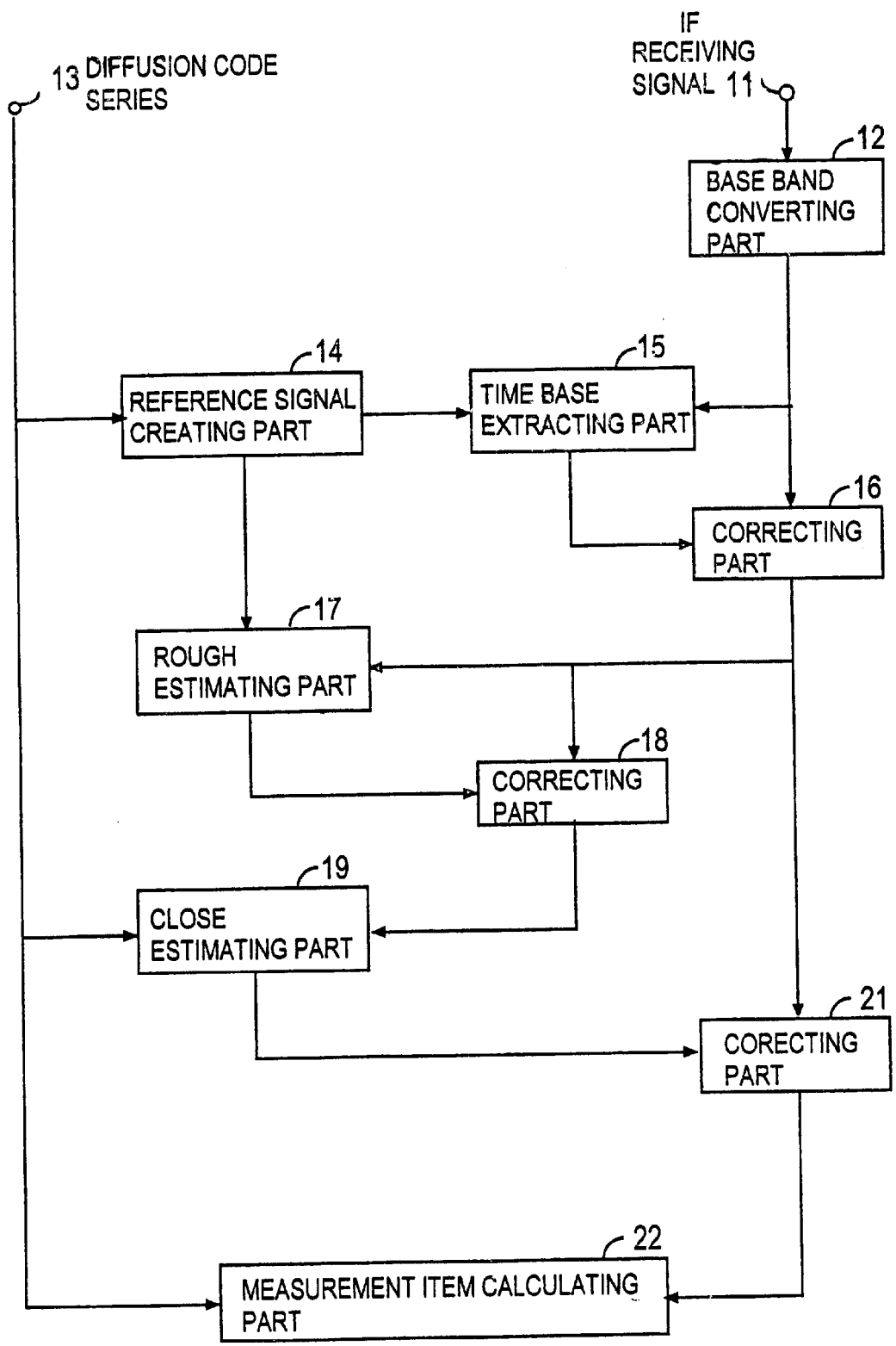
FIG. 5 is a block diagram showing a functional construction of a conventional measuring method.

The smaller the remaining error is, the more accurately the symbol estimating part can perform the estimation. Therefore, the estimation accuracy of τ can be improved by repeating, in the symbol point estimating part 47, the same number of processes as in the symbol point estimating part 37 using, when necessary, the corrected complex base band signal from the correcting part 42 and the reference signal as shown in FIG. 4. When the chip rate is 4.096 MHz, the number of taps of a base band filter is equal to a value corresponding to 11 chips and L is L=960, the estimation accuracy of is improved by approximately three times in the workstation.

As described above, according to the present invention, a time base slippage and a carrier frequency error are roughly estimated with respect to a received signal (a signal to be measured) converted to a complex base band signal. The complex base band signal is corrected by this estimated value. A reference signal is generated based on the corrected complex base band signal. A time base and a carrier frequency error are obtained using the reference signal and the complex base band signal. The complex base band signal is further corrected in accordance with the time base and the carrier frequency error. Since the measurement items are calculated using the corrected complex base band signal and the reference signal, the measurement items can correctly be obtained even if there is a relatively large carrier frequency error in the input signal.

What is claimed is:

1. A method for measuring a CDMA signal comprising:
   an orthogonal converting step for converting a digital signal to be measured into a first complex base band signal;
   a time base/frequency error estimating step for estimating a first signal delay value from said first complex base band signal and a diffusion code series and for estimating a first frequency error utilizing said estimated first signal delay value;
   a frequency error correcting step for correcting said first complex base band signal by said first frequency error and for shifting said first complex base band signal by said first signal delay value to obtain a second complex base band signal;
   a reference signal creating step for creating a reference signal from said second complex base band signal and a diffusion code series;
   a parameter estimating/correcting step for estimating and correcting a parameter from said second complex base band signal and said reference signal to obtain a third complex base band signal; and a measurement item calculating step for calculating a measurement item from said third complex base band signal and said reference signal.

2. The method for measuring a CDMA signal according to claim 1, wherein said orthogonal converting step includes a sampling rate converting step for converting a complex base band signal into a sampling frequency having n time frequency (n is an integer number) of its chip rate to obtain said first complex base band signal.

3. The method for measuring a CDMA signal according to claim 2, wherein said time base/frequency error estimating step comprises:

a symbol point extracting step for detecting a sampling point closest to a symbol point from said first complex base band signal to estimate said first signal delay value; and a synchronizing/frequency error estimating step for detecting, for each of said extracted symbol points, a phase of a diffusion code series from said first complex base band signal and a diffusion code series to estimate said first frequency error from the phase difference.

4. The method for measuring a CDMA signal according to claim 3, wherein said synchronizing/frequency error estimating step comprises:

a long code mask detecting step for detecting a long code mask portion from said first complex base band signal and a diffusion code series; and an estimating step for detecting a phase of a long code following the long code mask portion from said first complex base band signal and a diffusion code series to estimate said first frequency error from the phase difference.

5. The method for measuring a CDMA signal according to any one of claims 1 through 4, wherein said reference signal creating step comprises:

a demodulating/power estimating step for demodulating each channel from said second complex base band signal and a diffusion code series of each channel and for estimating a first power value of each channel; and a reference signal generating step for creating a reference signal of each channel from said diffusion code series of each channel and said first power value of each channel.

6. The method for measuring a CDMA signal according to any one of claims 1 through 4, wherein said parameter estimating/correcting step comprises:

a symbol point measuring step for estimating a second signal delay value from said second complex base band signal and said reference signal;

a signal delay correcting step for shifting said second complex base band signal by said second signal delay value to obtain said third complex base band signal;

a frequency error/initial phase estimating step for estimating a second frequency error and an initial phase of a carrier wave;

a frequency error/initial phase correcting step for correcting said third complex base band signal by said second frequency error and said initial phase value to obtain a fourth complex base band signal; and an amplitude estimating step for estimating an amplitude of each channel from said fourth complex base band signal and said reference signal.

7. The method for measuring a CDMA signal according to claim 6, wherein in said parameter estimating/correcting step, said symbol point measuring step and said signal delay correcting step are used a plurality of times.

8. The method for measuring a CDMA signal according to claim 5, wherein said parameter estimating/correcting step comprises:

a symbol point measuring step for estimating a second signal delay value from said second complex base band signal and said reference signal;

a signal delay correcting step for shifting said second complex base band signal by said second signal delay value to obtain said third complex base band signal;

a frequency error/initial phase estimating step for estimating a second frequency error and an initial phase of a carrier wave;

a frequency error/initial phase correcting step for correcting said third complex base band signal by said second frequency error and said initial phase value to obtain a fourth complex base band signal; and an amplitude estimating step for estimating an amplitude of each channel from said fourth complex base band signal and said reference signal.

9. The method for measuring a CDMA signal according to claim 8, wherein in said parameter estimating/correcting step, said symbol point measuring step and said signal delay correcting step are used a plurality of times.

* * * * *